June 19, 1962 K. H. MINDRUM ETAL 3,039,633

LOADER MECHANISM

Filed Dec. 8, 1958

INVENTORS.
KENNETH H. MINDRUM
DALE W. MCKEE
BY
*J. P. Wiessler*
ATTY.

United States Patent Office 3,039,633
Patented June 19, 1962

3,039,633
LOADER MECHANISM
Kenneth H. Mindrum and Dale W. McKee, Battle Creek, Mich., assignors to Clark Equipment Company, a corporation of Michigan
Filed Dec. 8, 1958, Ser. No. 778,675
9 Claims. (Cl. 214—390)

This invention relates to loader mechanism and more particularly to an improved self-loading and unloading trailer vehicle.

In the copending U.S. continuation-in-part patent application Ser. No. 577,118 of Jack E. Loomis, filed April 9, 1956, now Patent No. 3,014,604, there is disclosed a freight handling means and method for conveniently transporting freight without undue handling or loading and unloading from one transporting means to another. This is accomplished by utilizing portable freight carriers or containers of suitable dimensions which may be automatically anchored to and disconnected from a carrier supporting surface of transporting means, such for example as a railroad flatcar, a flatbed truck-trailer, a ship or aircraft, etc., by means of known materials handling equipment, such as fork lift trucks, straddle trucks and cranes, which materials handling equipment is also available for transferring such freight carrier means from one such transporting means to another. Numerous embodiments of freight carrier means, transporting means, materials handling equipment, and latching and anchor mechanism associated with the freight carrier means and transporting means are disclosed in said patent.

It has been found that in the use of such a freight handling system instances frequently arise, such as at relatively small freight terminals, wherein the use of such materials handling equipment as fork lift trucks, straddle trucks, cranes and the like is uneconomic due to the relatively small number of portable freight carriers which are handled in a given period of time. An invention which provides a relatively low cost means and method for effectively associating and disassociating suitable portable freight carrier means with transporting means, such as truck-trailers and the like, and for storing such freight carrier means separately from transporting means, is disclosed in the copending U.S. patent application Ser. No. 686,463 of Dale W. McKee, filed September 26, 1957, now Patent No. 2,983,394.

The instant invention provides portable trailer mechanism for not only associating and disassociating portable freight carrier means with transporting means, such as truck-trailers and the like, and for storing such carrier means separately from transporting means, but for also transporting such carrier means from one location to another.

According to our invention, we have provided a novel trailer mechanism for effectively and economically associating and disassociating such freight carrier structure with such transporting means as above noted without the necessity for utilizing expensive materials handling equipment as aforesaid.

It is therefore a principal object of our invention to provide an improved mechanism for detaching portable freight carrier means from transporting means and for retaining said freight carrier means separately from the transporting means.

A further object of our invention is to provide a relatively simple, low-cost and improved mechanism for engaging and disengaging a portable freight carrier with transporting means, and for mobilizing the freight carrier when separated from the transporting means without the necessity of utilizing expensive materials handling equipment, such as fork lift trucks, straddle carriers, cranes and the like.

Another object of our invention is to provide storage means for portable freight carrier structure which is also operable to associate and disassociate with transporting means such freight carrier structure.

In carrying out our invention we provide a generally U-shaped trailer device or loader mechanism capable of being moved in straddling relation to an over-the-road van varrying trailer, for example, and including pivotable wheeled supporting means which, together with interconnected pivotable coupling means plus actuating motor means therefor, is elevatable beneath a detachable freight container which is carried by the van carrying trailer to elevate the container above the transporting surface of the latter trailer. The interconnected coupling means and pivotable wheeled means may be actuated together to simultaneously lift the freight container from the over-the-road vehicle and to couple the loader mechanism with a powered tractor, for example, which may then transport the loader mechanism and freight container to a selected location. As a feature of the invention there is utilized pivotable engaging members adapted to engage beneath longitudinal side sections of the trailer vehicle.

The above and other objects, features and advantages of our invention will appear from the detailed description hereinbelow of a preferred embodiment.

Referring now in detail to the figures, the trailer vehicle or loader mechanism comprises a main frame which is composed of a pair of parallel and longitudinally extending members 10 of tubular cross section connected at their one ends by a third tubular member 12 to form a rearwardly opening U-shaped frame construction. The closed end of the frame is adapted to be supported, when the frame is in a lowered condition, by a pair of legs 14, one of which is shown, which depend downwardly from respective ones of tubular members 10.

Figure 2:
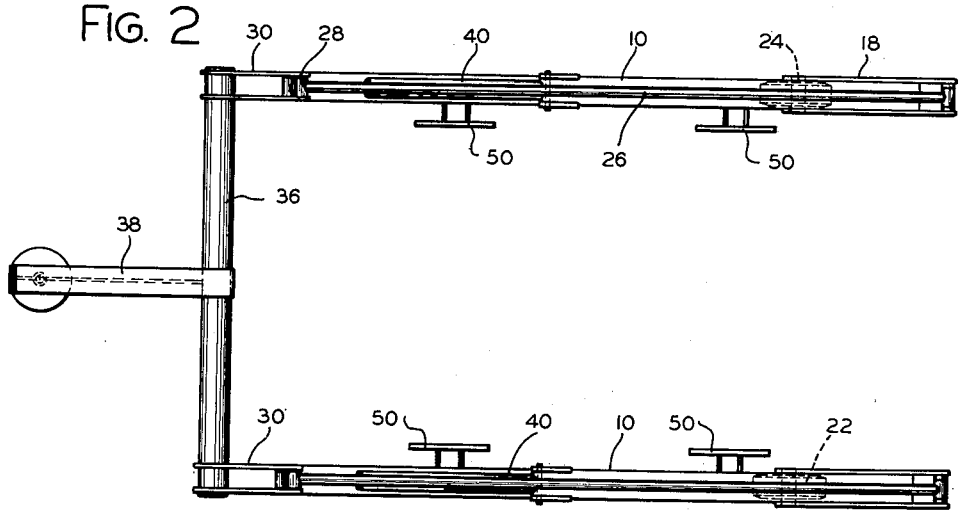
FIGURE 2 is a plan view of FIGURE 1 with the pivotable engaging members being shown in part only.

Adjacent the rear end of each member 10 and depending downwardly therefrom is a bracket 16 to which is connected for pivotal movement an angular lever 18. Each lever 18 comprises a pair of parallel plates (FIG. 2) which are pivotally connected intermediate the ends thereof by a pivot shaft 20 supported in bracket 16. A wheel 22 is mounted for rotation on a shaft 24 at the lower end of each lever 18, and connected for pivotal movement at the upper end thereof is an actuating rod 26 which extends forwardly of and above the frame to a pivotal connection 28 with a second lever means 30 located on the same side of the frame. Each lever 30 also comprises a pair of parallel plates which depend downwardly from pivot 28 to a pivotal connection 32 with an upwardly extending bracket 34 which is secured at the closed end of the U-shaped frame.

Intermediate the ends of the pair of lever means 30 and mounted centrally upon a transversely extending torque tube 36 is a forwardly extending coupling means 38 which is adapted, for example, to couple with a fifth-wheel construction of a powered tractor unit. A hydraulic motor actuator 40 is mounted above and in the plane of each side member 10 of the frame, and is pivotally connected at its one end to an upwardly extending bracket 42 and at its opposite end to the corresponding lever means 30.

Extension of the piston rods of hydraulic actuators 40 rotates both lever means 30 in a counterclockwise direction, thereby imparting lifting movement to the U-shaped frame as rods 26 are actuated generally forwardly and cause lever means 18 to also rotate in a counterclockwise direction about pivots shafts 20. Such rotation of lever means 18 activates the wheels 22 downwardly against the supporting surface which causes the open end of the frame to be elevated. Simultaneously the coupler arm 38 is also actuated in a counterclockwise direction with torque tube 36 and lever means 30 and into coupling engagement with, for example, the fifth-wheel of a tractor unit, whereupon continued actuation thereof imposes an upwardly directed force on the torque tube and lever means which causes the closed end of the frame to be also elevated. The torque tube 36, through which the lifting power is delivered to the coupler arm 38, insures equal movement of both side frame members 10. Similarly, through the medium of the linkage connection, equal travel is also imparted to the load wheels 22. During lifting movement legs 14, of course, will be raised above the supporting surface, whereby the loader mechanism may be mobilized as a wheeled trailer by the tractor vehicle.

Figure 1:
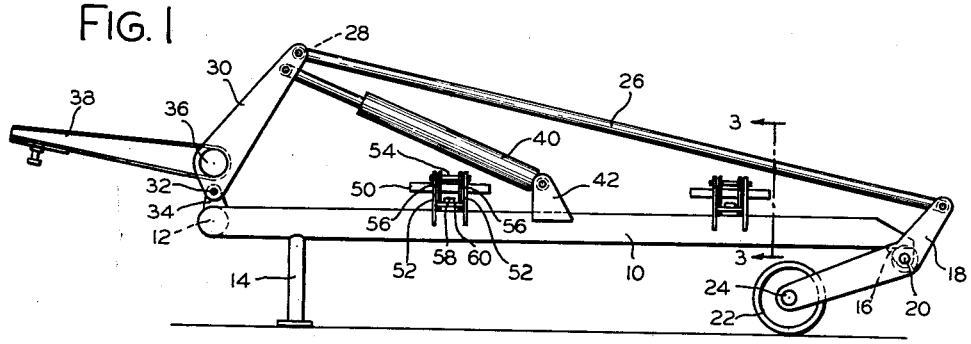
FIGURE 1 is a side view in elevation of a preferred embodiment of the loader mechanism or trailer vehicle of this invention.
Figure 3:
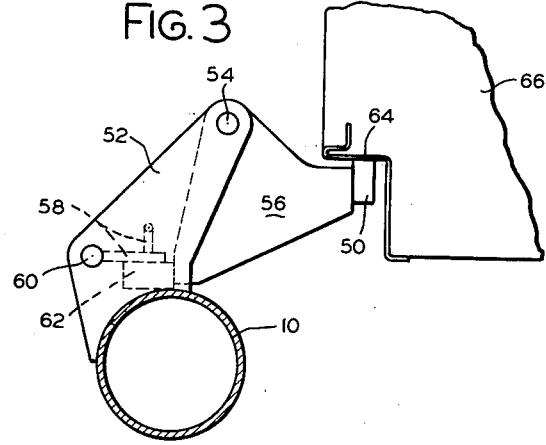
FIGURE 3 is an enlarged view in section taken along line 3—3 of FIGURE 1, and showing a broken away side section of a freight container engaged by a bearing bar of the engaging members of the loader mechanism.

A pair of longitudinally spaced bearing bars 50 are mounted for pivotal movement upon and relative to each tubular frame member 10. The mounting means of each bearing bar 50, which is illustrated in FIGS. 1 and 3, comprises a pair of upwardly extending and parallel bracket members 52 which are secured at the lower ends thereof, as by welding, to one of the tubular members 10, and which provides at the upper end thereof a pivot shaft 54 which extends between and is mounted upon said pair of bracket members. Pivotably mounted upon each said pivot shaft is a downwardly depending bracket 56 which comprises a pair of plate members mounted inwardly of each one of parallel bracket members 52 and which supports at the one end thereof one of the longitudinally extending bearing bars 50.

A manually actuatable handle 58 is mounted for rotational movement upon a shaft member 60 which extends between and is mounted upon each pair of parallel brackets 52. A bracket engaging block member 62 is attached to the underside of each handle member 58 and is adapted to engage the outer side edges of the corresponding pair of brackets 56 for actuating same with bearing bar 50 into and out of engaging position with a right angle adapter member 64 of a freight container 66 as the handle member 58 is rotated about shaft 60 in clockwise and counterclockwise directions, respectively, as viewed in FIG. 3.

Each freight container 66 is preferably provided at opposite sides thereof with adapters 64 which extend longitudinally of the container. The freight container may include latching mechanism, not shown, which is associatable with anchor mechanism of a conveyance, such as a railroad flatcar, over-the-road trailer and the like, not shown, as fully disclosed in the aforementioned patent of Loomis. In order to move each bearing bar 50 out of engagement with adapter 64 it is merely necessary to apply a counterclockwise force to handle means 58, whereupon the block member 62 will be rotated out of holding engagement with the respective bracket member 56 permitting said bracket member and bearing bar to rotate in a clockwise direction about shaft member 54 under the influence of gravity.

In operation, an over-the-road trailer unit carrying a detachable freight container 66 may be backed into position within the loader mechanism, or the loader mechanism backed into straddling position relative to the trailer. In this phase of the operation the loader mechanism is in a fully or almost fully lowered condition. When the loader mechanism is properly located relative to the trailer each of the bearing bars 50 is manually rotated into the position of FIG. 3 by handle and block means 58, 62 so as to be located for engaging and lifting the freight container from the trailer unit upon elevation of the loader frame.

Following the locating of the bearing blocks 50 in an operative position, hydraulic pump and valve means of conventional construction, not shown, are operated to energize hydraulic motors 40 so that the piston rods thereof move in extension, whereupon pairs of bracket means 18 and 30, along with coupler arm 38, rotate in a counterclockwise direction about the respective pivot shafts to elevate bearing bars 50 with the loader frame and associated mechanism as above described, thereby lifting container 66 above the trailer unit with which it was associated. The elevated loader mechanism and freight container may now be moved by the tractor unit out of straddling relation with the trailer unit, or, if desired, the trailer may be moved out of the open bay of the loader mechanism. Subsequent to such operation, the hydraulic motors 40 may be energized in an opposite direction to lower the device to the position shown in FIG. 1, while at the same time uncoupling arm 38 from the fifth-wheel of the tractor unit.

In this manner the freight container 66 may be stored at any selected location until such time as it is required to again associate the freight container with another over-the-road trailer. Such association is accomplished, of course, by reversing the aforementioned operation; i.e., by locating the loader mechanism in straddling relation to the trailer while in an elevated condition, and then actuating motors 40 in retraction to lower the loader mechanism, during which time the freight container will be engaged by the supporting surface of the trailer conveyance as the bearing bars 50 are moved downwardly with the loader mechanism out of engagement with adapter 64.

If docking facilities are available, for example, the loader mechanism may discharge its load upon a dock, thus relieving the loader mechanism for continuous work instead of necessitating its use as a temporary storage facility.

While the foregoing disclosure is directed to a particular embodiment of means for associating and disassociating freight containers with transporting means, it is to be understood that numerous changes and substitution of parts may be made therein without departing from the scope and spirit of the invention. As a consequence, it is not our intention to be limited to the particular device embodying the features of our invention as hereinabove described and as illustrated in the accompanying drawings, except as may appear in the claims appended.

We claim:
1. A loader mechanism comprising a generally horizontal U-shaped frame, coupler means supported from the closed end of the frame for pivotal movement in a vertical direction, a pair of transversely spaced lever arms pivotally mounted on opposite sides of the frame adjacent the open end thereof, a pair of wheels mounted upon the one ends of said lever arms for pivotal movement therewith beneath the U-shaped frame and in the vertical planes of the respective sides of said frame, and motive power means interconnecting said coupler and wheels to effect simultaneous pivotal movement thereof relative to the frame, said motive power means being located above each side leg of the U-shaped frame in non-interfering relation with the open load embracing pocket of the frame, and said coupler means being connectible to a towing vehicle upon downward pivotal movement thereof, whereby actuation in one direction of said coupler and wheels by said motive power means effects upward movement of the frame as the coupler means is actuated into abutment with a portion of the tractor vehicle for imposing an upwardly directed force on the closed end of the frame and the wheels are activated downwardly in the planes of the respective sides of the frame against the supporting surface of the loader mechanism for effecting upward movement of the open end of the frame.

2. A loader mechanism as claimed in claim 1, wherein said motive power means comprises a pair of hydraulic cylinder means operatively connected at their one ends to opposite sides of the frame and at the opposite ends to the coupler and wheels, energization of the cylinder means effecting simultaneous movement of the coupler and wheels in the same direction about the respective pivots therefor.

3. A loader mechanism as claimed in claim 1 wherein said coupler means extends forwardly of the closed end of the frame, a pair of levers pivoted from opposite sides of the closed end of the frame, and torque transmitting means interconnecting said pivoted levers and the coupler means, said motive means comprising a pair of transversely spaced hydraulic motor means connected to opposite sides of the frame and to said coupler means through said pivoted levers and torque transmitting means.

4. A trailer vehicle for engaging, lifting and transporting freight containers and adapted to be coupled with a towing vehicle, comprising a generally horizontal U-shaped frame means, a first lever arm pivotally mounted adjacent the open end of each of the sides of the U-shaped frame, a wheel mounted for rotation adjacent one end of each first lever arm, a second lever arm pivotally mounted adjacent the closed end of the frame at each side thereof, means connecting each longitudinally spaced pair of first and second lever arms, hydraulic motor means mounted on each side of the U-shaped frame intermediate each such pair of lever arms and operatively connected thereto for actuating the lever arms and connecting means in rotation about the respective pivots thereof, a transverse torque transmitting member interconnecting the pivoted lever arms at the closed end of the frame and twistable to maintain substantially equal loading on said pair of motor means during actuation thereof, and a coupler arm connected to said transverse member and extending forwardly thereof from the frame, said hydraulic motor means being selectively actuatable to rotate the connected pairs of lever arms in unison through said torque transmtting means, whereby to effect simultaneous pivotal movement of the wheels and coupler arm relative to the frame causing said frame to be raised when the coupler arm is actuated downwardly into engagement with coupling means of a towing vehicle.

5. A trailer vehicle for engaging, lifting and transporting freight containers and adapted to be coupled with a towing vehicle, comprising a generally horizontal U-shaped frame means, a first lever arm pivotally mounted adjacent the open end of each of the sides of the U-shaped frame, a wheel mounted for rotation adjacent one end of each first lever arm, a second lever arm pivotally mounted adjacent the closed end of the frame at each side thereof, means connecting each longitudinally spaced pair of first and second lever arms, hydraulic motor means mounted on each side of the U-shaped frame and operatively connected to the lever arms and connecting means for actuating same in rotation about the respective pivots thereof, a transverse torque transmitting tube interconnecting the pivoted lever arms at the closed end of the frame, and a coupler arm connected at its one end to the torque tube and extending forwardly of the frame, said hydraulic motor means being selectively actuatable to rotate the connected pairs of lever arms in unison through said interconnecting torque tube, whereby to effect simultaneous pivotal movement of the wheels and coupler arm relative to the frame causing said frame to be raised when the coupler arm is actuated downwardly into engagement with coupling means of a towing vehicle.

6. A trailer vehicle for engaging, lifting and transporting freight containers and adapted to be coupled with a towing vehicle, comprising a generally horizontal U-shaped frame means, a first lever arm pivotally mounted adjacent the open end of each of the sides of the U-shaped frame, a wheel mounted for rotation adjacent one end of each first lever arm, each such wheel and lever arm being mounted such that each wheel is disposed beneath and in the plane of the respective side of the U-shaped frame, a second lever arm pivotally mounted adjacent the closed end of the frame at each side thereof, means connecting each longitudinally spaced pair of first and second lever arms, hydraulic motor means mounted on each side of the U-shaped frame and operatively connected to the lever arms and connecting means for actuating same in rotation about the respective pivots thereof, a transverse member interconnecting the pivoted lever arms at the closed end of the frame, and a coupler arm connected to said transverse member intermediate the ends thereof and extending forwardly thereof from the frame, said hydraulic motor means being selectively actuatable to rotate the connected pairs of lever arms in unison, whereby to effect simultaneous pivotal movement of the wheels and coupler arm relative to the frame causing said frame to be raised when the coupler arm is actuated downwardly into engagement with coupling means of a towing vehicle.

7. A trailer vehicle as claimed in claim 4 plus support means secured to and extending above each side of the frame, freight container engaging means pivoted from each said support means above the respective leg of the frame and means for actuating said pivoted means inwardly of the frame for engaging a freight container.

8. A trailer vehicle for engaging, lifting and transporting freight containers and adapted to be coupled with a towing vehicle, comprising a generally horizontal U-shaped frame means, a first lever arm pivotally mounted adjacent the open end of each of the sides of the U-shaped frame, a wheel mounted for rotation adjacent one end of each first lever arm, each such wheel and lever arm being mounted such that each wheel is disposed beneath and in the plane of the respective side of the U-shaped frame, a second lever arm pivotally mounted adjacent the closed end of the frame at each side thereof, means connecting each pair of longitudinally spaced lever arms, hydraulic motor means mounted on each side of the U-shaped frame and operatively connected to the lever arms and connecting means for actuating same in rotation about the respective pivots thereof, a transverse torque transmitting member interconnecting said second pivoted lever arms, and a coupler arm connected at its one end to the torque member and extending forwardly of the frame, said hydraulic motor means being selectively actuatable to rotate the connected pairs of lever arms in unison through said torque member and to elevate the frame means.

9. A trailer vehicle for engaging, lifting and transporting freight containers and adapted to be coupled with a towing vehicle, comprising a generally horizontal U-shaped frame means, a pair of transversely spaced lever arms mounted upon opposite sides of the frame means adjacent the open end thereof, a pair of wheels mounted upon the one ends of said lever arms for pivotal movement therewith beneath the U-shaped frame and in the planes of the opposite sides of said frame, a second pair of transversely spaced lever arms extending upwardly from the closed end of the frame and mounted for pivotal movement adjacent opposite sides of the frame, hydraulic cylinder and piston motor means mounted on each side of the frame and extending longitudinally thereof for connection with one of said pair of lever arms, a pair of connecting members extending longitudinally and above each side of the frame for connecting longitudinally spaced ones of said lever arms, a torque equalizing member semi-rigidly connecting said second pair of lever arms, and a coupler arm connected to the torque equalizing member and extending forwardly of the frame, energization of said hydraulic motor means causing simultaneous pivotal movement of said first and second pairs of lever arms through force equalizing twisting movement of said torque equalizing member for elevating the frame.

References Cited in the file of this patent

UNITED STATES PATENTS

| | | |
|---|---|---|
| 2,240,564 | LeTourneau | May 6, 1941 |
| 2,547,269 | Kinsey | Apr. 3, 1951 |
| 2,693,288 | Black | Nov. 2, 1954 |
| 2,723,129 | Sprague | Nov. 8, 1955 |
| 2,780,475 | Koerner | Feb. 5, 1957 |

FOREIGN PATENTS

| | | |
|---|---|---|
| 724,135 | Great Britain | Feb. 16, 1955 |